(12) United States Patent
Keating et al.

(10) Patent No.: US 11,190,610 B2
(45) Date of Patent: Nov. 30, 2021

(54) REDIRECTION BRIDGE DEVICE AND SYSTEM, A COMMUNICATION SYSTEM COMPRISING A REDIRECTION BRIDGE DEVICE OR SYSTEM, A METHOD OF REDIRECTION BRIDGING, USE OF A USER INTERFACE AND A SOFTWARE PRODUCT

(71) Applicant: WEBTEXT HOLDINGS LIMITED, Dublin (IE)

(72) Inventors: Colm Keating, Sandycove (IE); A J Cahill, Salthill (IE); Carl Fleming, Dublin (IE); Eoghan Moylan, Barna (IE); Garrett Jordan, Galway (IE)

(73) Assignee: WEBTEXT HOLDINGS LIMITED, Dublin (IE)

( * ) Notice: Subject to any disclaimer, the term of this patent is extended or adjusted under 35 U.S.C. 154(b) by 0 days.

(21) Appl. No.: 16/485,352

(22) PCT Filed: Dec. 11, 2017

(86) PCT No.: PCT/IB2017/057784
§ 371 (c)(1),
(2) Date: Aug. 12, 2019

(87) PCT Pub. No.: WO2018/150242
PCT Pub. Date: Aug. 23, 2018

(65) Prior Publication Data
US 2019/0379757 A1   Dec. 12, 2019

(30) Foreign Application Priority Data
Feb. 14, 2017   (EP) ..................................... 17156155

(51) Int. Cl.
*H04L 12/58*   (2006.01)
*G06Q 30/00*   (2012.01)
*H04L 29/08*   (2006.01)

(52) U.S. Cl.
CPC ....... *H04L 67/2833* (2013.01); *G06Q 30/016* (2013.01); *H04L 51/04* (2013.01);
(Continued)

(58) Field of Classification Search
CPC ......... H04L 51/00–38; H04L 65/00–80; H04L 67/28–2895; G06Q 30/016
See application file for complete search history.

(56) References Cited

U.S. PATENT DOCUMENTS 6,687,241 B1 * 2/2004 Goss ....................... H04L 29/06
370/352
7,003,463 B1 * 2/2006 Maes ................ H04L 29/06027
704/231
(Continued)

FOREIGN PATENT DOCUMENTS

EP   1241853 A2   9/2002
EP   2328328 A2   6/2011
(Continued)

OTHER PUBLICATIONS

European Search Report issued in European Patent Application No. 17156155.8 dated Aug. 8, 2017, 10 pages.
(Continued)

*Primary Examiner* — David R Lazaro
*Assistant Examiner* — Julian Chang
(74) *Attorney, Agent, or Firm* — Pearne & Gordon LLP

(57) ABSTRACT

A redirection bridge device, RBD (10, 20), comprising: —an API interface (300) comprising an API input (301), arranged capable of receiving a request (300A) from an application (APP) (30), arranged located on a user device (1100) associated with a user (1000), for the purposes of requesting metadata, said metadata being specific to at least one contact option (2100) arranged in association with at least one Enterprise (2000), a metadata store (310), for storing meta-
(Continued)

data specific to the at least one Enterprise (2000), and arranged to provide metadata to the API interface (300) in response to the request (300A), and, a Communications Manager (320), arranged in co-operation with the API interface (300) and the at least one contact option (2100), for facilitating contact between the user device (1100) and the at least one contact option (2100). A redirection bridge system, a communication system, a method of redirection bridging and use of a user interface and software product for implementation of the redirection bridging method.

19 Claims, 13 Drawing Sheets

(52) U.S. Cl.
CPC .......... *H04L 51/36* (2013.01); *H04L 67/2804* (2013.01); *H04L 67/2814* (2013.01)

(56) References Cited

U.S. PATENT DOCUMENTS

| | | | | |
|---|---|---|---|---|
| 7,010,572 B1* | 3/2006 | Benjamin | ............ | G06Q 10/107 709/206 |
| 7,571,208 B2* | 8/2009 | Syed | ............ | H04L 67/02 709/203 |
| 7,979,802 B1* | 7/2011 | Appelman | ............ | G06F 15/16 715/752 |
| 8,406,155 B1* | 3/2013 | Vasquez | ............ | H04L 41/5064 370/259 |
| 8,886,243 B1* | 11/2014 | Pabla | ............ | H04W 4/08 455/518 |
| 9,369,433 B1* | 6/2016 | Paul | ............ | H04L 63/0227 |
| 9,450,901 B1* | 9/2016 | Smullen | ............ | H04L 51/046 |
| 9,774,558 B2* | 9/2017 | Olsen | ............ | G06Q 10/06 |
| 9,785,798 B1* | 10/2017 | Enderwick | ............ | H04L 67/42 |
| 10,284,723 B1* | 5/2019 | Neuer, III | ............ | H04M 3/5175 |
| 10,447,853 B1* | 10/2019 | Ouimette | ............ | H04M 3/5133 |
| 10,460,324 B1* | 10/2019 | Westen | ............ | G06F 11/0793 |
| 10,616,345 B1* | 4/2020 | Ouimette | ............ | H04L 67/26 |
| 2001/0025309 A1* | 9/2001 | Macleod Beck | ..... | G06F 40/279 709/223 |
| 2002/0042277 A1* | 4/2002 | Smith | ............ | H04W 8/18 455/456.2 |
| 2002/0078153 A1* | 6/2002 | Chung | ............ | H04Q 11/0435 709/204 |
| 2003/0074410 A1* | 4/2003 | Kay | ............ | H04L 63/08 709/206 |
| 2003/0215067 A1* | 11/2003 | Ordille | ............ | G06Q 10/107 379/88.13 |
| 2004/0210844 A1* | 10/2004 | Pettinati | ............ | G06Q 10/10 715/708 |
| 2004/0254904 A1* | 12/2004 | Nelken | ............ | G06N 5/022 706/50 |
| 2005/0091272 A1* | 4/2005 | Smith | ............ | G06Q 10/06 |
| 2005/0102368 A1* | 5/2005 | Forman | ............ | G06Q 10/107 709/207 |
| 2005/0114652 A1* | 5/2005 | Swedor | ............ | H04L 9/3263 713/156 |
| 2006/0177011 A1* | 8/2006 | Skakkebaek | ............ | H04L 51/36 379/67.1 |
| 2006/0177014 A1* | 8/2006 | Skakkebaek | ............ | H04M 3/53 379/67.1 |
| 2007/0042756 A1* | 2/2007 | Perfetto | ............ | H04M 1/72525 455/412.1 |
| 2007/0042792 A1* | 2/2007 | Perfetto | ............ | H04M 3/42382 455/461 |
| 2007/0220143 A1* | 9/2007 | Lund | ............ | H04L 51/04 709/224 |
| 2008/0123587 A1* | 5/2008 | Xu | ............ | H04M 3/42229 370/329 |
| 2008/0137642 A1* | 6/2008 | Teodosiu | ............ | H04L 65/1036 370/352 |
| 2009/0198645 A1* | 8/2009 | Srikanth | ............ | H04L 51/32 |
| 2009/0210789 A1* | 8/2009 | Thakkar | ............ | H04L 65/403 715/719 |
| 2009/0300520 A1* | 12/2009 | Ashutosh | ............ | H04L 12/1831 715/756 |
| 2009/0319623 A1* | 12/2009 | Srinivasan | ............ | G06Q 10/107 709/206 |
| 2009/0319916 A1* | 12/2009 | Gudipaty | ............ | H04L 65/403 715/753 |
| 2010/0058234 A1* | 3/2010 | Salame | ............ | H04M 3/5237 715/810 |
| 2010/0149975 A1* | 6/2010 | Tripathi | ............ | H04L 67/04 370/230.1 |
| 2011/0047246 A1* | 2/2011 | Frissora | ............ | H04L 67/24 709/219 |
| 2011/0071950 A1* | 3/2011 | Ivanovic | ............ | H04L 51/32 705/304 |
| 2011/0123005 A1* | 5/2011 | Segall | ............ | H04M 3/5183 379/88.13 |
| 2011/0270921 A1* | 11/2011 | Jones | ............ | H04M 3/567 709/204 |
| 2011/0270922 A1* | 11/2011 | Jones | ............ | H04L 65/1093 709/204 |
| 2011/0270933 A1* | 11/2011 | Jones | ............ | H04L 12/1822 709/206 |
| 2011/0271192 A1* | 11/2011 | Jones | ............ | G06F 3/043 715/727 |
| 2011/0271209 A1* | 11/2011 | Jones | ............ | H04L 67/36 715/753 |
| 2011/0271210 A1* | 11/2011 | Jones | ............ | H04L 67/36 715/753 |
| 2012/0057688 A1* | 3/2012 | Pickering | ............ | G06Q 30/0256 379/201.02 |
| 2012/0166345 A1* | 6/2012 | Klemm | ............ | G06Q 30/016 705/304 |
| 2012/0190333 A1* | 7/2012 | Portman | ............ | H04L 67/141 455/411 |
| 2012/0244891 A1* | 9/2012 | Appleton | ............ | H04M 3/42102 455/466 |
| 2013/0066987 A1 | 3/2013 | Levinson et al. | | |
| 2013/0091551 A1* | 4/2013 | Rajakarunanayake | ............ | H04L 51/32 726/4 |
| 2013/0198635 A1* | 8/2013 | Jones | ............ | G06F 3/0481 715/727 |
| 2013/0218682 A1* | 8/2013 | Alterman | ............ | G06Q 10/00 705/14.58 |
| 2013/0218721 A1* | 8/2013 | Borhan | ............ | G06Q 30/02 705/26.41 |
| 2013/0342635 A1* | 12/2013 | Yurchenko | ............ | H04L 67/306 348/14.08 |
| 2014/0126708 A1* | 5/2014 | Sayko | ............ | H04L 67/22 379/93.01 |
| 2014/0126714 A1* | 5/2014 | Sayko | ............ | H04L 65/1069 379/265.09 |
| 2014/0126715 A1* | 5/2014 | Lum | ............ | H04M 3/5191 379/265.09 |
| 2014/0237057 A1 | 8/2014 | Khodorenko | | |
| 2014/0280595 A1* | 9/2014 | Mani | ............ | H04L 67/10 709/204 |
| 2014/0344446 A1* | 11/2014 | Rjeili | ............ | H04N 7/147 709/224 |
| 2015/0039700 A1* | 2/2015 | West | ............ | H04L 51/04 709/206 |
| 2015/0081784 A1* | 3/2015 | Ng | ............ | G06F 16/955 709/204 |
| 2015/0312188 A1* | 10/2015 | White | ............ | H04L 51/046 709/204 |
| 2016/0078455 A1* | 3/2016 | O'Donnell | ............ | G06F 16/955 705/7.29 |
| 2016/0112497 A1* | 4/2016 | Koushik | ............ | G06F 8/61 726/7 |
| 2016/0165065 A1* | 6/2016 | Damstra | ............ | H04L 12/1485 455/408 |
| 2016/0239165 A1* | 8/2016 | Chen | ............ | H04L 51/24 |
| 2016/0284031 A1* | 9/2016 | Quon | ............ | G06Q 30/01 |

(56) References Cited

U.S. PATENT DOCUMENTS

| | | | |
|---|---|---|---|
| 2016/0285794 A1* | 9/2016 | Naidu | H04L 51/14 |
| 2016/0366237 A1* | 12/2016 | Cahill | H04L 67/2804 |
| 2017/0048170 A1* | 2/2017 | Smullen | H04L 67/02 |
| 2017/0142257 A1* | 5/2017 | Sampath | H04M 3/5191 |
| 2017/0195394 A1* | 7/2017 | Kothari | H04L 65/1069 |
| 2017/0230329 A1* | 8/2017 | Akef | H04L 67/02 |
| 2017/0272504 A1 | 9/2017 | Cahill et al. | |
| 2017/0279906 A1* | 9/2017 | Laird-McConnell | H04L 67/306 |
| 2017/0324867 A1* | 11/2017 | Tamblyn | H04L 51/24 |
| 2017/0324868 A1* | 11/2017 | Tamblyn | H04M 3/58 |
| 2018/0007202 A1* | 1/2018 | Batlle | H04M 3/5166 |
| 2018/0103150 A1* | 4/2018 | Chavez | H04L 12/1496 |
| 2019/0007552 A1* | 1/2019 | James | H04M 3/42059 |
| 2019/0342237 A1* | 11/2019 | Ma | G06Q 10/06 |
| 2019/0379757 A1* | 12/2019 | Keating | H04L 67/2804 |
| 2019/0379789 A1* | 12/2019 | Keating | H04M 3/5141 |
| 2020/0053143 A1* | 2/2020 | Paillet | H04L 65/80 |

FOREIGN PATENT DOCUMENTS

| | | | |
|---|---|---|---|
| WO | 2009111674 A2 | 9/2009 | |
| WO | 2012003533 A1 | 1/2012 | |
| WO | 2017158558 A1 | 9/2017 | |

OTHER PUBLICATIONS

International Search Report and Written Opinion in PCT/IB2017/057784 dated Feb. 21, 2018, 12 pages.
European Office Action for Application 17 817 902.4 dated Jan. 29, 2021.

* cited by examiner

REDIRECTION BRIDGE DEVICE AND SYSTEM, A COMMUNICATION SYSTEM COMPRISING A REDIRECTION BRIDGE DEVICE OR SYSTEM, A METHOD OF REDIRECTION BRIDGING, USE OF A USER INTERFACE AND A SOFTWARE PRODUCT

FIELD OF THE INVENTION

The present invention relates to a redirection bridge device (RBD) device for facilitating connection to Enterprises, arranged capable of interaction with user devices in the field of messaging and communications, specifically in the field of communication between mobile devices and Enterprise systems. The present invention further relates to a redirection bridge system (RBD system) comprising such a device. The present invention further relates to a communication system comprising an RBD or RBD system. In addition, the present invention relates to a method of operating such a device and to use of a user interface facilitating a least one step of the method. Further, the invention relates to a software product arranged capable of implementation of the method.

BACKGROUND OF THE INVENTION

In the field of messaging and communications, many devices and applications are available to facilitate various forms of messaging and information exchange. The development and capabilities of devices and methods have rapidly expanded based on the accessibility and use of the world wide web and internet and the implementation of standardised communication protocols, such as HTTP, HTTPS, XMPP, SMPP, TCP/IP etc. The development of mobile devices, such as smart phones, has allowed information of many types to be available to a user by means of a single multi-functional device, conveniently and without being reliant on a location based, specific system or device. The user has great flexibility in the choice of communication methods available, such as email, chat services, voice call and SMS or text. In addition, web browsing and other forms of information exchange are facilitated. Enterprises, including (but not limited to) examples such as businesses, government organisations, clubs, social networks, call centres etc. have reacted to the changing technologies by ensuring their presence and availability to a user in a variety of ways, including various communication options. Enterprises frequently provide chat services, voice call services, email capability, social media presence e.g. Facebook and Twitter accounts, dedicated websites or web portals, in order to interact with the user. Indeed, the public at large now anticipate at least one or more of such services to be present by default and the Enterprise gains advantage by providing a plurality of communication options. In the context of this application, we refer to Enterprises, (defined according to common usage) as businesses or companies or other related entrepreneurial activities. For example, SME's (small to medium sized enterprises) are generally referred to a small to medium sized enterprises, dependent on the company size or business financial turnover. Enterprises may also be considered as any group or organization providing services to customers, with whom it may wish to communicate through a variety of disparate channels or communication types. In particular, this communication may comprise automated messaging, person-to-person messaging, or a combination of the two.

Provision of such a broad range of services and communication possibilities does present difficulties, however, not only to the Enterprise but also to the user. In order to access a dedicated website belonging to an Enterprise, the user must access an application (APP) present on whatever device is available to them e.g. a mobile device or computer. The user device normally comprises an application programming interface (API) with which the APP is co-operative. In another common arrangement, the APP may poll directly, for information or contact or connection with other devices outside the environment of the user device, such that the APP is in direct contact with the outside world beyond the user device. The APP then facilitates particular functionality, often associated with a particular Enterprise. Examples of APP's for web browsing include, for example, Safari or Explorer. Frequently, the user will want to use a mobile device, such as a smart phone, so as to collect information as easily as possible, on the move, or to retain everything on one device, which is usually present with them. In order to access a different kind of information, such as a Facebook account of the Enterprise, the user must have a Facebook application (Facebook APP) installed on their mobile device. Most mobile devices comprise capability or applications (APP's) for various forms of direct communication, such as text messaging (e.g. SMS, MMS, Messenger) or web chat or voice call. Most Enterprises will have similar provisions at their side to allow interaction. In some cases, the Enterprises comprise contact centres, which facilitate different links of communication with options for chat, messaging and/or email. A provision for call back to a user if the Enterprise is busy, is frequently a further option.

FIG. 10 is a schematic illustration of a plurality of interactions, effected between at least one user 1000 and at least one Enterprise 2000, according to the state of the art. The user 1000 is shown as utilising a single mobile device 1100 comprising four applications (APP's) 1200 1300 1400 1500. APP 1200 is shown here as an Enterprise dedicated APP, while email 1300, SMS 1400 and voice call 1500 APP's or facilities are present on this mobile device (e.g. a smart phone) as standard. The Enterprise 2000 comprises a plurality of contact options 2100 for the user, namely a dedicated APP 2200, a webportal 2300, a Contact Centre 2400 here embedded in the Enterprise itself and a phone line 2500. Arrows 3000 illustrate possible interactions between the user and the Enterprise under these conditions. The figure depicts one potential situation only for the purposes of illustration and should not be considered as limiting, as more than one user or Enterprise could be present, the Enterprise might provide only one contact option 2100, a different type of device could be used by the user and the number of APP's is not restricted—a single APP could be present on the device. Different kinds of APP may be present. Similarly, more than one Enterprise could be present, different functionalities or APP's belonging to different Enterprises.

It should be noted that while the user has many options for interacting with different parts of the Enterprise according to the functionality provided, each interaction may require a separate connection to the Enterprise. While an Enterprise contact centre 2400 can facilitate user interaction 3000A 3000B 3000C by email 1300, SMS 1400 or voice call 1500, an independent communication means and separate connection is needed at the user side. In order to connect user 1000 and Enterprise 2000 by means of the dedicated APP 1200 2200, respectively, a completely independent interaction 3000D is required. Traditional contact by phone or voice call is indicated by arrow 3000E.

The mutual and dual provision of applications APP's (or application programming interfaces API's) and functionality between the user and the Enterprise affords the possibility for mutual interaction. However, this is not the whole story. The APP's of e.g. the user, such as text messaging capability, often rely on the provisions of another party, such as a messaging service or platform to which the user is subscribed. Different platforms comprise different characteristics and processes. The use of intermediary services, such as artificial intelligence (AI), virtual agents, or automated 'bot' services, may also be present at the side of the Enterprise. Said intermediary services provide access to 'static' information, such as account type or account balances (i.e. reference-type information), or provide 'intelligent' information, allowing a 'human-like' dialogue for certain interaction types. A Contact Centre associated with the Enterprise may also be provided by a third party, with no access to Enterprise business systems and information. Well known Contact Centre system functionalities are provided, for example, by Cisco, Avaya, Genesys, Salesforce, Oracle, Liveperson. Not all contact centre systems provide the same functionality—some may not comprise messaging, for example. Dedicated APP's may be required for use. Thus, while the user—Enterprise interaction may be direct, it may also be very complex with many stakeholders in the chain. The chain can also be linked, either completely or in part, by various mutual interactions or associations, including protective security measures, for example.

A problem exists in the current provisions of the art in that access to e.g. secure environments comprised in Enterprise contact options, or other options not immediately accessible by normal communication provisions or located in disparate systems, frequently requires separate connection on the side of the user, if further processing is to be done at the Enterprise side, possibly even by means of a different user device.

SUMMARY OF THE INVENTION

The present invention seeks to provide an improved user experience by facilitating optimised access to various Enterprises.

This is achieved by means of embodiments of the present invention by providing user connection using a device arranged to facilitate redirection.

According to a first aspect of the present invention, there is provided a redirection bridge device (RBD), as claimed in appended claim 1, comprising:—
  an API interface comprising
    an API input, arranged capable of receiving a request from an application (APP), arranged located on a user device associated with a user, for the purposes of requesting metadata, said metadata being specific to at least one contact option arranged in association with at least one Enterprise,
  a metadata store, for storing metadata specific to the at least one Enterprise, and arranged to provide metadata to the API interface in response to the request, and,
  a Communications Manager, arranged in co-operation with the API interface and the at least one contact option, for facilitating contact between the user device and the at least one contact option.

The invention is of advantage in that it provides a streamlined process and access to at least one Enterprise (or optionally, a plurality of Enterprises), making improvement in the user experience and facilitating access to Enterprise data, which allows a simultaneous assessment of collected information from different contact options.

Further advantages of the various embodiments of the present invention also include:—
  Retrieval of information from multiple contact vendors, which run contact centre platforms from a multitude of vendors;
  normalisation and provision of this information in a common format via purpose designed APP;
  facilitation of e.g. two-way chat to disparate enterprise chat systems, using a single universal APP;
  a single connection operation for the user which prevents break in communication and the necessity for re-connection at a different contact option, sometimes of the same Enterprise;
  facilitation of access to a single point of contact, whereby access to the described plurality of communication channels and Enterprise data sources can be gained via the purpose-designed, dedicated application (APP).

Optionally, the redirection bridge system further comprises that: —
the Communications Manager further comprises at least one specialist component arranged as dedicated to a specific communication task or format.

Optionally, the redirection bridge system further comprises that: —
the Communications Manager further comprises a Chat Manager or a Web portal Manager or a Message Transfer System or an active component of a Message Transfer System.

Optionally, the redirection bridge system further comprises that: —
the stored metadata in the metadata store comprises at least one URL for connection to the at least one Enterprise OR a list of a plurality of Enterprises and the metadata associated with each Enterprise OR at least one contact option.

Optionally, the redirection bridge system further comprises that: —
the metadata store is further arranged in co-operation with the API interface, for data transfer of metadata to the application (APP).

Optionally, the redirection bridge system further comprises that: —
data transferred to the application (APP) comprises metadata.

Optionally, the redirection bridge system further comprises that: —
the API Interface further comprises an API output, for optionally facilitating data transfer to the application (APP).

Optionally, the redirection bridge system further comprises that: —
the metadata store comprises a programmable metadata store, PMS.

According to a second aspect of the invention, as claimed in appended claim 9, there is provided a redirection bridge system comprising a redirection bridge device, RBD. The redirection bridge system further comprises an Admin control arranged in co-operation with an Admin interface, said Admin interface being arranged located on the redirection bridge device and further arranged in co-operation with the PMS, such that the Admin control is arranged capable of amending or updating the metadata comprised in the programmable metadata store (PMS) by means of the Admin interface.

Optionally, the redirection bridge device or redirection bridge system, is arranged in association with: — a messaging platform arranged to facilitate access to the at least one application (APP), arranged located on a user device associated with a user, AND/OR;

an integration platform arranged to facilitate access to the at least one contact option arranged in association with the at least one Enterprise.

According to a third aspect of the invention, as claimed in appended claim 11, there is provided a communication system comprising a redirection bridge device or a redirection bridge system.

According to a fourth aspect of the invention, as claimed in appended claim 12 there is provided use of a user interface, comprised in the user device, when, the user interface is being arranged to receive OR interpret OR display Enterprise data OR to effect use of the metadata, obtained according to any of the methods according to the fifth aspect of the invention, preferably the user device comprising a mobile device.

According to a fifth aspect of the invention, there is provided a method of redirection bridging, as claimed in appended claim 13: there is provided a method of redirection bridging, comprising the steps of:— arranging an API input capable of receiving a request from an application (APP), located on a user device associated with a user, for the purposes of requesting metadata, said metadata being specific to at least one contact option arranged in association with at least one Enterprise, said API input being comprised in an API Interface of the RBD;

storing metadata specific to the at least one Enterprise in a metadata store comprised in the RBD;

arranging a Communications Manager in co-operation with the API interface and the at least one contact option, for facilitating contact between the user device and the at least one contact option.

Optionally, the method further comprises the steps of:— arranging the Communications Manager to further comprise at least one specialist component arranged as dedicated to a specific communication task or format; AND/OR, arranging the Communications Manager to further comprise a Chat Manager or a Web portal Manager or a Message Transfer System or an active component of a Message Transfer System; AND/OR, arranging the stored metadata in the metadata store to comprise at least one URL for connection to the at least one Enterprise OR a list of a plurality of Enterprises and the metadata associated with each Enterprise OR at least one contact option; AND/OR, further arranging the metadata store in co-operation with the API interface, for data transfer of metadata to the application (APP), optionally, further arranging the data transferred to APP to comprise metadata or Enterprise data; AND/OR, arranging the API Interface to further comprise an API output, for optionally facilitating data transfer to the application (APP); AND/OR, arranging the metadata store to comprise a programmable metadata store, PMS.

Optionally, when the metadata store is arranged to comprise a programmable metadata store PMS, the method further comprises the step of:— providing a redirection bridge system comprising a redirection bridge device, RBD, further comprising an Admin control arranged in co-operation with an Admin interface, said Admin interface being arranged located on the redirection bridge device and further arranged in co-operation with the PMS, such that the Admin control is arranged capable of amending or updating the metadata comprised in the PMS by means of the Admin interface.

According to a sixth aspect of the present invention, as claimed in appended claim 16, there is provided a software product recorded on machine readable data storage media, characterized in that the software product is executable upon computing hardware for implementing a method pursuant to the fifth aspect of the invention.

It will be appreciated that features of the invention are susceptible to being combined in any combination without departing from the scope of the invention as defined by the appended claims.

DESCRIPTION OF THE FIGURES

Embodiments of the present invention will now be described, by way of example only, with reference to the following diagrams wherein.

Figure 1:
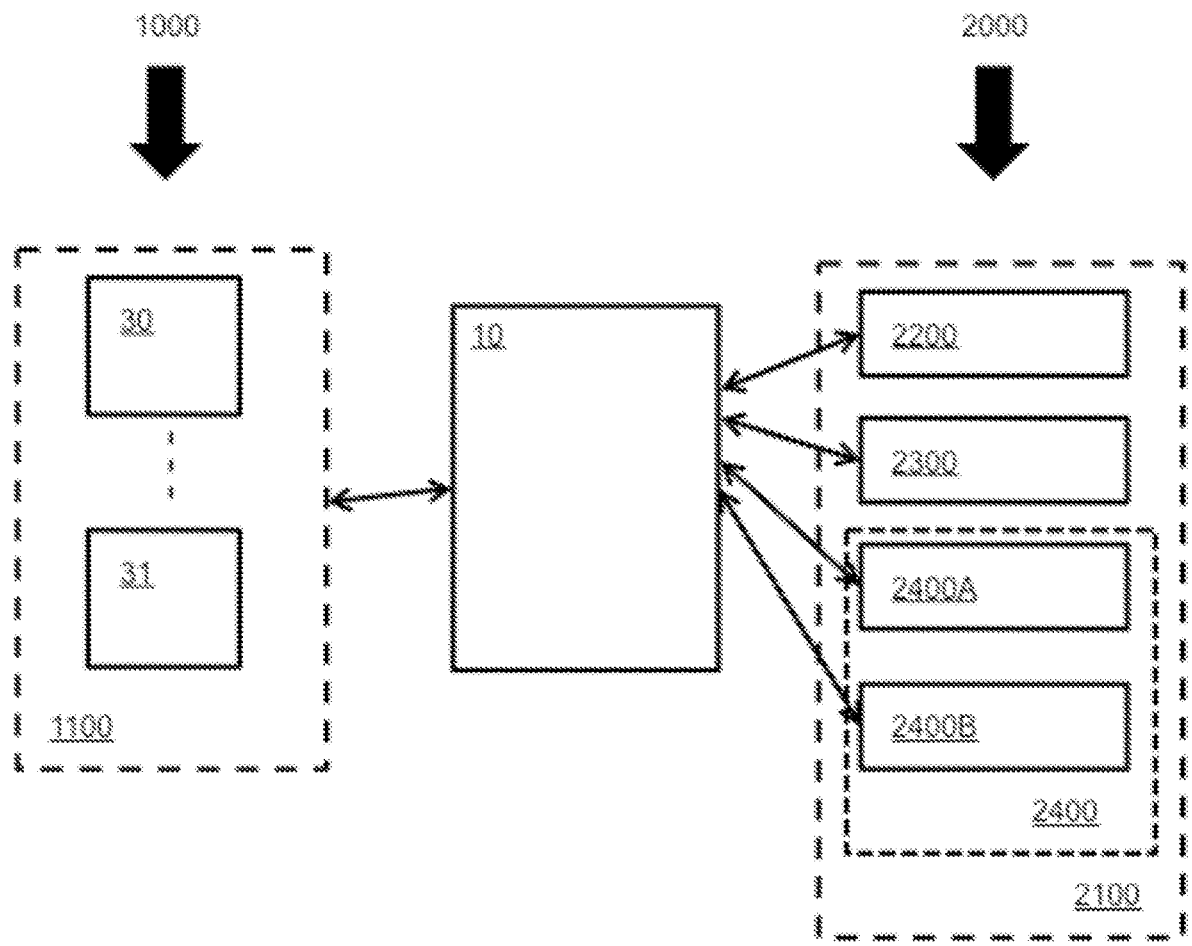
FIG. 1 is an illustration of a RBD device (redirection bridge device) according to a first embodiment of the present invention, arranged in co-operation with a user mobile device and a plurality of Enterprises.

In the accompanying diagrams, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing. Reference numerals are kept consistent throughout the set of figures, where a numeral refers to the same feature in several drawings.

When describing embodiments of the invention, it will be appreciated that the mobile device illustrated is, in fact, only one device available to a user. The user could equally access the provisions of the embodiments of the present invention from an alternative device with similar capabilities, such as a notebook computer, a desktop or laptop computer or other device capable of comprising and operating the APP functionality described.

The redirection bridge device (RBD) is here described and illustrated as an independent, free standing device but this should not be considered as limiting. Implementation of embodiments of the present invention as e.g. distributed components or systems or processes, are possible.

FIG. 1 is an illustration of a RBD device 10 according to a first embodiment of the present invention, arranged in co-operation with a user 1000 mobile device 1100 and a plurality of Enterprise 2000 options 2100. The options 2200 2300 2400A and 2400B shown here do not necessarily belong to only one Enterprise but may be related to one or more Enterprises. Option 2200 here relates to an APP (application) related to the Enterprise 2000, such as a dedicated APP, option 2300 relates to a webportal and options 2400A and 2400B are different options comprised in a contact centre 2400, which itself may or may not be integral to the Enterprise 2000. These options 2100 are indicated for the purposes of illustration only and they should not be considered as limiting.

The user 1000 has arranged a plurality of n APP's (APP$_1$ 30 to APP$_n$ 31) on the mobile device 1100 which are dedicated to particular desired functionality and comprise different characteristics and ways of working, including the codes and processes used to communicate with other devices and applications. (This plurality of n APP's illustrated in the figure should not be considered as limiting, as only one APP is needed on the mobile device in order to facilitate use of any embodiment of the present invention). In principle, a plurality of users can interact with the RBD device, each user employing one or more APP's. Interactions between components, users and Enterprises are indicated by means of the arrows shown in the figure. Advantageously, the RBD 10 simplifies connection for the user by providing, in the least complex scenario, a single contact point between mobile device 1100 and RBD 10. The RBD 10 then assumes the responsibility for connection to the Enterprises 2000 or Enterprise options 2100 by means of one, or more, connections.

In the context of the present description, Enterprises are defined to comprise businesses or companies or other related entrepreneurial activities. Specifically, examples may comprise businesses of various sizes, government organisations, clubs, social networks, call centres etc.

The description concentrates on a single user 1000 connecting to or acquiring data from one or more Enterprise contact options 2100. However, this should not be considered as limiting. The RBD 10 20 according to embodiments of the present invention can facilitate, in parallel or sequentially (which can depend on the load on the device), connections between a plurality of users 1000 or Enterprise options 2100. Load balancing or prioritisation (of users or Enterprise options or Enterprises) can also be implemented, as desired.

Figure 2:
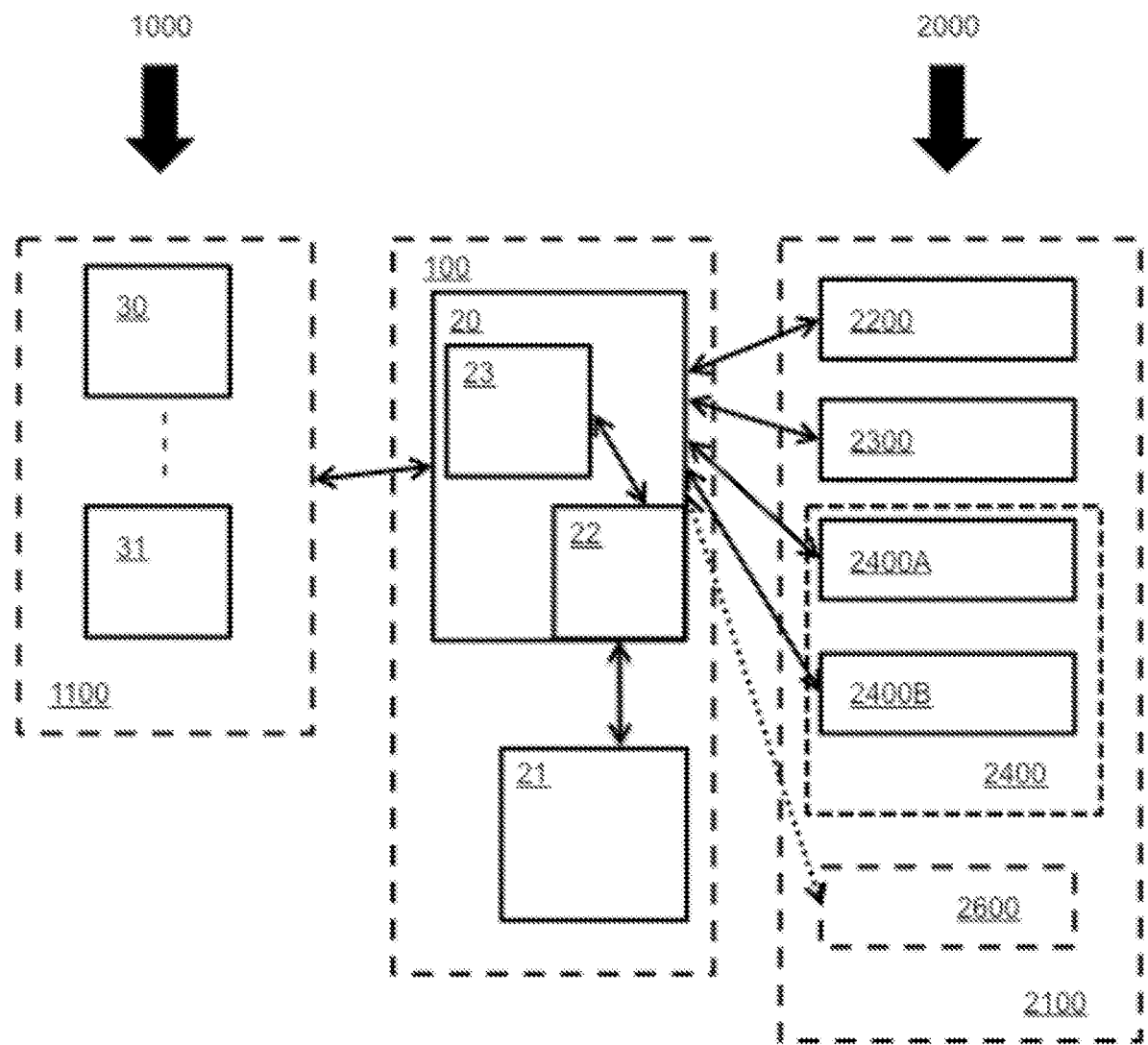
FIG. 2 is an illustration of a RBD device according to a second embodiment of the present invention, further comprising a programmable metadata store facilitated by means of an admin interface and an admin control, arranged in co-operation with a user mobile device and a plurality of Enterprises.

Referring to FIG. 2, which is an illustration of a RBD device 20 according to a second embodiment of the present invention further comprising a programmable metadata store PMS (23) facilitated by means of an Admin interface 22 and an Admin control 21, arranged in co-operation with a user mobile device and a plurality of Enterprises, the device 20 is further arranged in co-operation with an Admin Control 21 to form a system 100. The device 20 is identical in content and function to the device of the first embodiment but further comprises an Admin Interface 22 (arranged to facilitate the transfer of instruction and data between the Admin Control 21 and the device 20) and a programmable metadata store (PMS) 23. An advantage of the provisions of the RBD device 20 according to the second embodiment of the present invention is that additional interactions and connections to new Enterprises or additional Enterprise related options 2600 can be added by means of an update instruction from Admin Control 21 concerning data associated with one or more (existing or new) Enterprises to be added to the PMS (Programmable Metadata Store) 23. It should be noted that RBD device 20 is capable of operation and function without reference to the Admin Control 21, in which case the device 20 of the second embodiment acts and functions in the same manner as the device 10 of the first embodiment. The PMS 23 simply acts as a metadata store in this instance. When the device 20 of the second embodiment of the present invention is arranged in co-operation with an Admin Control to form a system 100, the additional programmable functionality of the PMS facilitates the amendment of the metadata store and thereby alters or extends or reduces the range or number of Enterprises accessible by the device to implement a method according to embodiments of the present invention.

In the context of the present description, 'metadata' comprises information relating to parameters associated with the Enterprise, or to variables which may be obtained from the Enterprise, either by active request of the RBD 10 20 in response to a user or by collection from the Enterprise itself which actively provides the information. A (non-exhaustive) list of examples comprises: — agents_available
language
product
skillset
priority
support_level
average_response_time
number_of_contacts
number_of_chats_active
chat_history
issue_history
number_of_past_chats
backend_action_type
backend_action_address
menu_option_chosen_count
session_time
channel
attachment
mime_type
allow_callback
callback_number
queue_position The metadata, such as the examples shown above, may comprise names characterising the function of the data. For example, "language" is a parameter arranged to take several possible values or attributes, all of which describe the language in which the Enterprise provides information or expects input e.g. English.

Referring to FIG. 1 and FIG. 2, it should be noted that any of the APP's 30 31 located on the mobile device 1100 may poll to directly obtain information or data from the RBD 10 20 (not shown).

The following description refers predominantly to one APP 30 in order to further explain the embodiments of the present invention. This should not be considered as limiting, as a plurality of APP's 30 31 may be present on a user device (or devices), some or all of which may be suitable for the processes described.

FIG. 1 and FIG. 2 illustrate, schematically, the relationship between the user and user device with the RBD devices according to embodiments of the present invention and also the relationship between said RBD devices and the Enterprise(s). The RBD devices are independent of user and Enterprise but are arranged to be able to co-operate, communicate and gather information and instruction from user or Enterprise. The devices 10 20 are arranged capable of utilising known formats, codes, protocols means and processes to address the multiple needs of contact to, and interaction with, disparate and technically different and diverse APP's and/or Enterprises and/or Enterprise components. Encryption protocols can be, optionally, implemented as desired, comprised in embodiments of the present invention. This can relate to interaction between the RBD and the user, the RBD and the Enterprise (or contact options) or the intermediate communication stages comprised therein. At least part of the functionality required by the device 10 20 to access and interact with a plurality of platforms, optionally comprises use of, or interaction with, e.g. a Message Transfer System, as outlined in U.S. patent application Ser. No. 15/072,440 (Mar. 17, 2016) and international patent application PCT/IB2017/051548, also published as WO/2017/158558 A1.

The RBD devices 10 20 act as a bridge between user 1000 and Enterprise 2000 to facilitate optimal interaction for the user 1000 in terms of ease of process and ease of communication.

The RBD devices, components and action will now be described further in relation to FIG. 3 (A to D) to FIG. 7.

Figure 3A:
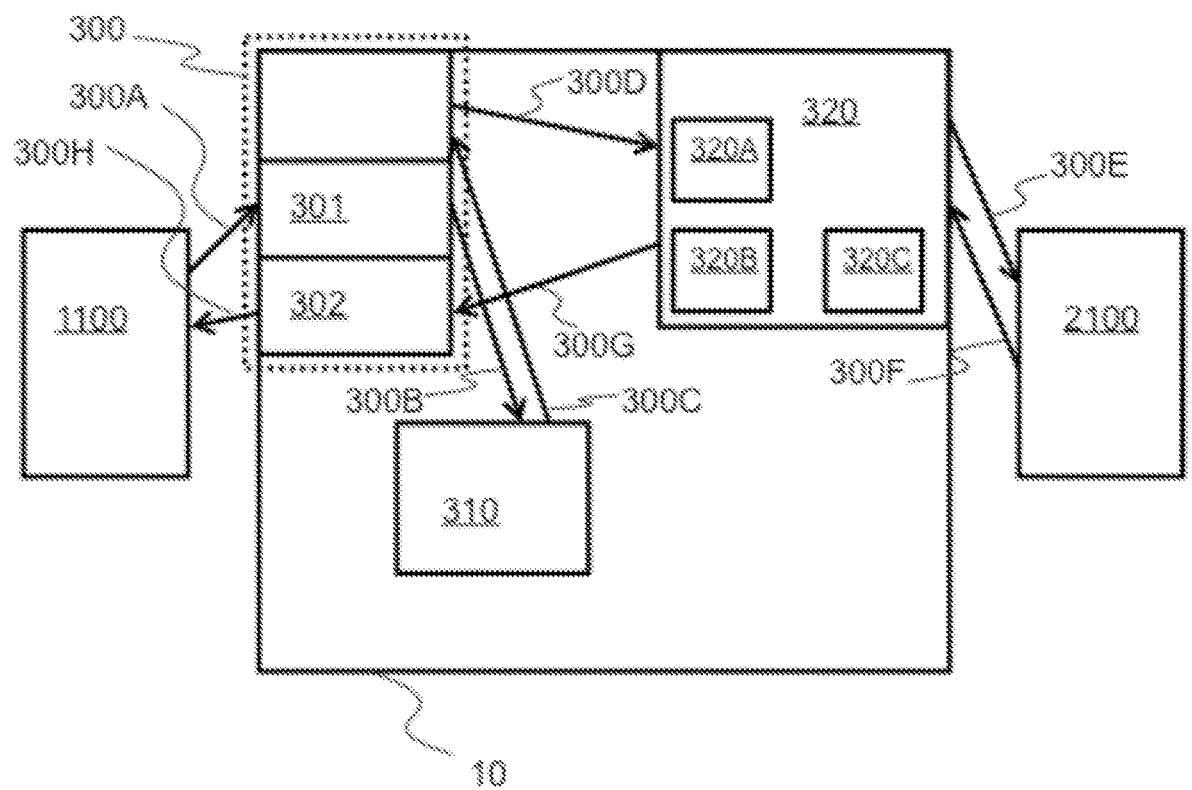
FIG. 3A is a further illustration of a RBD device according to the first embodiment of the present invention.

Referring now to FIG. 3A, which shows a further illustration of the RBD device according to the first embodiment of the present invention 10, the RBD is shown as comprising an API interface 300, which further comprises an API input 301, arranged to interact with at least one APP 30 (not shown) present on the mobile device 1100 of the user 1000 (not shown). The APP 30 (not shown) could also be implemented as an application programming interface (API), dedicated to the user device, or as an Integration Point, said Integration Point being arranged to handle any kind of interaction the user device 1100 might have with a device 10 20 according to any embodiment of the present invention. The API interface 300 is arranged capable of interaction with multiple kinds of APP using a variety of known formats and protocols, as comprised in the current state of the art, as desired.

Via the API input 301, the user 1000 can optionally request specific information using the APP 30 present on his/her device 1100, as illustrated by arrow 300A. The API interface 300 is arranged co-operatively with a metadata store 310, as illustrated by arrows 300B 300C, respectively. The metadata store 310 comprises metadata related to one or more Enterprises, which the RBD 10 can access or contact or communicate with. Information relating to e.g. URL's associated with Enterprise contact options 2100, can be stored in the metadata store or e.g. a list of different Enterprises, optionally with order of preferential contact, can be placed there for reference. Requested metadata or data is reverted to the API interface 300 or direct to an API output 302 by the metadata store 310.

The RDB 10 further comprises a Communications Manager 320 arranged capable of interaction with a plurality of Enterprise contact options 2100 using known protocols and procedures. The Communications Manager 320 optionally further comprises at least one specialist component dedicated to a specific communication task or format. For example, in the figure the Communications Manager 320 further comprises a Chat Manager 320A, a Web portal Manager 320B and a Message Transfer System 320C or at least an active component thereof, said Message Transfer System being disclosed in U.S. patent application Ser. No. 15/072,440 (Mar. 17, 2016).

The Message Transfer System (MTS) 320C provides an improved messaging capability over the current state of the art, particularly with respect to SMS messaging. The MTS is designed to transfer messages between a sender and receiver by means of interfaces to the system. For example, a message to be sent arriving either at interface of the MTS or at interface located on a message transfer node (MTN) is transferred through the MTN and output at an interface which is arranged connected to at least one delivery agent, such as a mobile network or returned after processing to one of interfaces for delivery to a different application. Said incoming message may originate from a third party or other application/system (a send agent). Interfaces are then capable of delivering a processed message, e.g. for the purpose of forwarding said message to another third party or other application/system (a delivery agent). In order to effectively transfer the message on behalf of the MTS, the MTN of the MTS acts as an intermediate destination. Ideally, the message is highly transient at the MTN. This facilitates speed of transfer, high efficiency and large capacity of the MTS system.

For example, Enterprise contact option 2100 in this figure can be regarded as a Contact Centre associated with a business, which the user wishes to contact. The Contact Centre may have multiple contact possibilities, such as web chat, voice call, text messaging. Many interactions between the user 1000 (not shown) and the Enterprise 2000 (not shown) can be facilitated by standard connection to the Enterprise but for some interactions or transactions, it may be necessary for the connection to be more secure or specific. For example, when making a payment, when dealing with sensitive information, when processes require specific use of a business system to which a first-line chat operator has no access, etc. In such circumstances, the user 1000 is frequently required to disconnect from the first point of contact with the Enterprise 2100 in order to re-establish a separate second contact with the more secure environment. This causes delay and requires effort on the part of the user. In some cases the re-connection to the more secure environment may require use of a particular URL, for example, to access a secure web domain or website. The re-connection may not be straightforward or may be delayed if the website is heavily in use.

The RBD 10 facilitates the user to achieve the second contact with the Enterprise 2000, or to directly make a first contact with an Enterprise contact option 2100 if desired, by means of user request received at the API Interface 300 or API input 301. The user request comprises a request for information related to the Enterprise e.g. a URL. Such information is available in the metadata store 310 and is arranged to be passed back to the API interface 300. This is indicated by arrows 300B 300C. According to embodiments of the present invention, however, rather than output the information or metadata directly back to the user via the API output 302, which is also an option, the API Interface 300 diverts (arrow 300D) the metadata to the Communications Manager 320. The Communications Manager 320 either assigns a specialist component, such as the chat manager 320A, to directly interface with the desired Enterprise contact option 2100, based on the metadata obtained from the API Interface 300, or directly facilitates access to the Enterprise contact option 2100, as indicated by arrow 300E. Information returned, as indicated by arrow 300F is then returned (arrow 300G) to the API output 302 for forwarding (arrow 300H) to the user 1000 (not shown) by means of the APP 30. The effect of this action by the RDB device 10 is to allow the user 1000 to access various options associated with the Enterprise 2000 by means of a smooth single association with one (RDB) device 10 thereby creating a seamless user experience in the access of at least one, but potentially a plurality, of different Enterprise contact options 2100, each of which may comprise different connections or levels of security. To the user, all are accessible by means of a request to a single device.

Figure 3B:
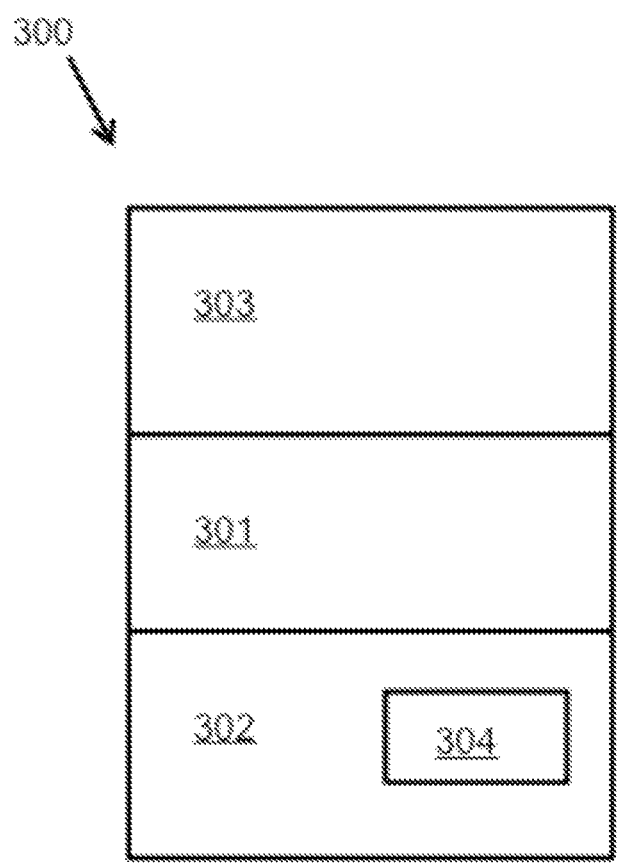
FIG. 3B is an illustration of the API interface of FIG. 3A.

Referring now to FIG. 3B, which comprises an illustration of the API interface 300, two sub-components of the API interface 300 are shown in addition to the API input 301 and API output 302, namely an RBD admin component 303 and a translator module 304. (The following description also refers to FIG. 3A for details of processing). The RBD admin component 303 facilitates processing of the user input or request from API input 301. A user request for connection (arrow 300A) is input at the API input 301. Information concerning the requested Enterprise 2000 or Enterprise contact option 2100 is obtained from the metadata store (arrows 300B 300C), after which the RBD admin component 303 directs the request to the Communications Manager 320. The Communications Manager 320 assigns the appropriate module, preferably according to the type of communication interaction required e.g. 320A 320B 320C, and connection is facilitated for the user.

Optionally, the API output 302 further comprises a translator module 304. The translator module 304 can be arranged to transmit information or data back to the mobile device 1100 in a specific, preferred or optimal format, depending on how the data to be viewed by the user 1000 is best presented or has been requested. For example, the translator module 304 can effect the translation by means of an intermediary JSON object, as outlined in U.S. patent application Ser. No. 15/072,440 (Mar. 17, 2016) and international patent application PCT/IB2017/051548, also published as WO/2017/158558 A1.

For data storage, it is preferred that the data comprise a JSON format. For output, JSON, HTML and XML are preferred. However, many formats may be used successfully in accordance with embodiments of the present invention.

Figure 3C:
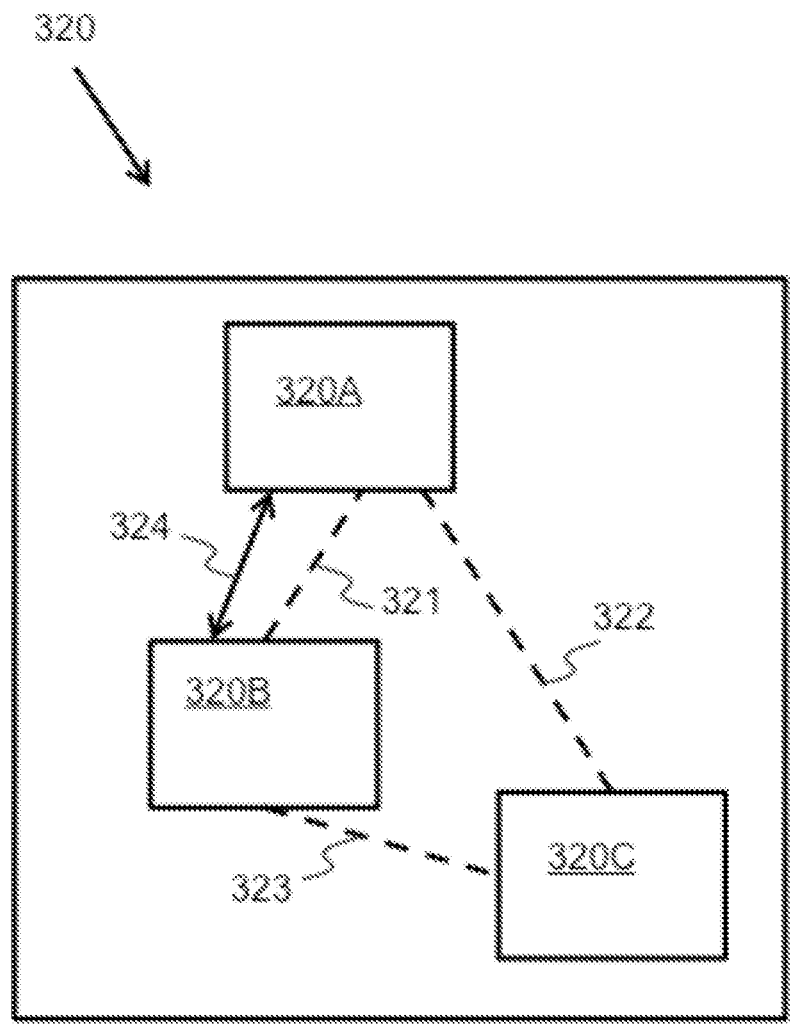
FIG. 3C is an illustration of the Communications Manager of FIG. 3A.

Referring now to FIG. 3C, which is an illustration of the Communications Manager of FIG. 3A. As discussed above, the Communications Manager 320 may comprise at least one sub module dedicated to a particular type of communication or interaction. For the purposes of illustration here, these modules are shown in the figures as a Chat Manager 320A, a Web portal Manager 320B and a Message Transfer System 320C. These sub modules are capable of acting without reference to one another, in an independent manner, dedicated as they are to particular communication tasks. Under normal operating conditions, this way of working allows the modules to work in parallel and without reference to other modules within the Communications Manage 320. However, this is not always the case. In some circumstances, it may be both desirable and beneficial for modules to be able to interact. Such interaction or association is schematically described in the figure by means of dashed lines 321 322 323.

As an example of the transfer of interactions between sub components of the Communications Manager 320, consider the advantageous interaction between Chat Manager 320A and Web portal Manager 320B, now described. Arrow 324 illustrates the two-way interaction of this particular example. Should the need arise to escalate an unattended interaction, e.g. via the Web portal 320B, to an attended interaction, e.g. via Chat Manager 320A, the association between the two sub modules makes this possible. Conversely, a de-escalation, in the opposite direction from chat to web portal, is also possible. In this example, this would result in the Chat Manager 320A transferring the user 1000 back to the Web portal Manager 320B.

The example just described should, of course, not be considered as limiting. Mechanisms and protocols can be established within the Communications Manager 320 to allow for and manage many different scenarios. The interaction with a human agent e.g. of a contact centre 2400, can be considered as the highest (or peak) form of interaction possible for the user, with other options being ranked as desired. From the perspective of the human agent, it is further possible to implement agreed or known (optionally, special or unique to a particular Enterprise) commands which can be implemented towards the RBD 10 20 by the human agent, to trigger certain actions, such as de-escalation. This allows Enterprise contact options 2100 to be tailored according to agreements with the Enterprises 2000, for implementation of a level of control over interactions with a user, via the RBD device. Such provisions advantageously allow resources to be managed at the Enterprise or contact option side.

Figure 3D:
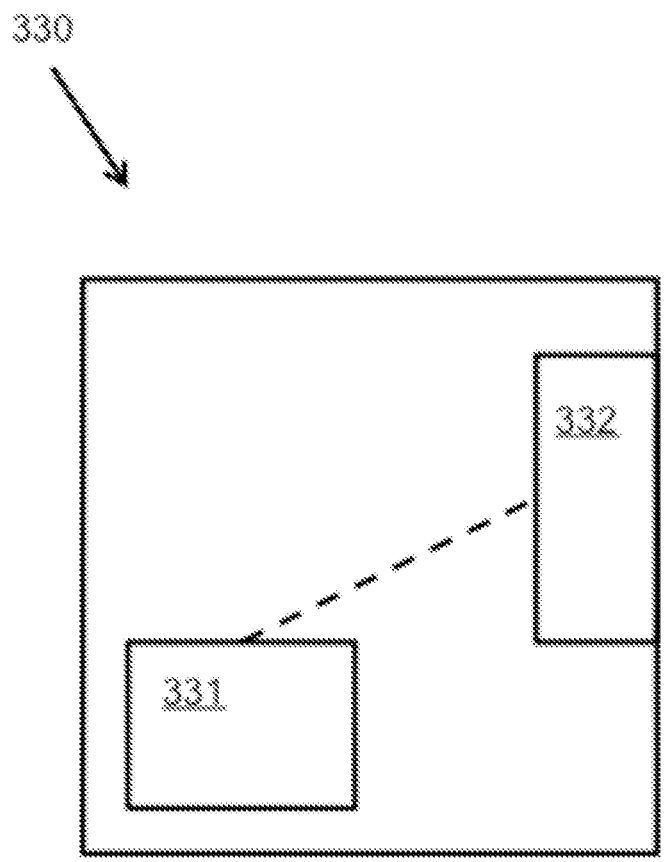
FIG. 3D is an illustration of an Enterprise data collector, which may be optionally comprised in a RBD.

Referring now to FIG. 3D, which is an illustration of an Enterprise data collector, which may be optionally comprised in a RBD. FIG. 3D comprises an illustration of the Enterprise data collector 330, two sub-components comprised in the Enterprise data collector 330 are shown, namely a controller 331 and a tailored interface 332, which are arranged co-operative with each other. The Enterprise data collector is optionally located on the RBD device 10 20 and is used to provide further support services, based on information collected or received from the Enterprise 2000, for example via contact options 2100, such Enterprise data being made available to the metadata store 310 for set-up or update of the metadata comprised therein.

Enterprise data controller 330 receives information from the metadata store 310 concerning a known list of Enterprises. The metadata comprises, for example, information about possible contact options for the Enterprise, access keys or passwords, special access points within the Enterprise system which may not be available to a casual visitor to the Enterprise system or communication language requirements, etc. This metadata is thus associated with an Enterprise which is already known to the RBD device, the association being based on a business arrangement where the Enterprise provides sufficient information (in advance) to allow set up of the redirection bridge device (RBD) 10 to facilitate proper access and information gathering by the RBD 10. The Enterprise information is stored in the metadata store 310 for use by the RBD 10. The metadata facilitates interaction between the RBD 10 and the Enterprise 2000, via the Enterprise contact options 2100.

Metadata relating to the Enterprise 2000, present in the metadata store 310 comprises information about the Enterprise, known in advance and used for Enterprise characterisation and access, which may be classed as 'static' information. In other words it is related to the acquisition and presentation of information, which comes from the Enterprise by polling, the latter being consequently regarded as 'dynamic' information.

The effect of this knowledge and set-up at the RBD side is to allow tailoring of the RBD connection to the Enterprise, according to what is available. The connection between the RBD and the Enterprise is facilitated in an automatic manner, thereby making a smoother information gathering process. This is akin to an "auto-identification" process, where the connection is made without further reference to the user. The set-up allows a secure connection between RBD and Enterprise which is also protective for the Enterprise in that a single entity is connected to the Enterprise system, as opposed to a plurality of individual user connections, and said connection has the potential to be made to a different part of the Enterprise system under different conditions to a direct user connection, if so desired. Alternatively, instead of making use of the metadata provided for connection, it is also possible for the RBD to connect by direct inquiry, if so desired. The connection is thus tailored to the Enterprise. In addition, the actual connection can be achieved such that specific software, exclusive to the RBD device 10, can be implemented if desired, to further enhance the security of the connection. The connection can be facilitated by http or other protocol and/or may be directed to a different interface of the Enterprise than that normally available to the rest of the world, possibly also not normally accessible to the user. A lower level interface of the Enterprise system could be used to expose types of information to the RBD 10 which creates a special gate or entry point. In the case of a contact centre system associated with the Enterprise, a dedicated application (API) could be provided for this purpose.

The redirection bridge device (RBD) 10, thus preferentially utilises pre-authorisation at the Enterprise side in order to be able to collect data on demand from the Enterprise. The Enterprise is thus protected, as no unauthorised device can access the Enterprise information. The RBD 10 can thus obtain already published or public information or obtain information from the private resources of the Enterprise.

Enterprise data collector 330 comprises a controller 331. The metadata input as described above is provided to this controller (from metadata store 310). The controller 331 is in communication with a tailored interface 332, also comprised in the Enterprise data collector 330, as shown in FIG. 3D. The controller 331 effects a polling of the Enterprise (which may be cyclical) for information, by means of the tailored interface 332, as based on the metadata received by user request and/or by automatic polling for specific information based on the metadata associated with the Enterprise itself. The tailored interface 332 can be further arranged to effect parallel polling of different Enterprise attributes, can effect prioritised polling, can be arranged to poll based on a known Enterprise refresh rate or can be adjustable dependent on information returned from the Enterprise side, as controlled by the controller 331. The tailored interface 332 can allow or facilitate a characteristic connection to the Enterprise. The controller 331 may comprise a module running a particular type of software script, preferably Python script for optimised performance. The controller 331 can be arranged to assign a specific interaction or software process to each client Enterprise, for enhanced performance during operation.

Metadata also comprises input from the user 1000 via mobile device 1100. This is provided to the metadata store 310 from the API interface (more specifically from the RBD admin (administration) component 303.

Important examples of metadata are:
attributes of a particular Enterprise e.g. wait time;
a property of a variable useful to the user 1000, e.g. useable to the user to achieve something;
facilitating or enabling information or data;
properties or information relevant to allow the user to make a decision or to allow a choice to be made;
descriptive data, a relevant subset of which is provided to the user, choice led by the RBD 10 20, which is already primed with information about the Enterprise and consequently already targets what options, e.g. streaming platform, call centre, etc., are available at the Enterprise side.

Having obtained the required information from the Enterprise 2000 by means of tailored interface 332, the data obtained is then transferred from the Enterprise data collector 330 to metadata store 310. Optionally, the data obtained can be normalised to a preferred standard format for storage.

A RBD 10 20 with static, unchanging, information comprised in the metadata store 310, is independent of further information or data being provided from the side of the Enterprise and operates based on the metadata as provided, without further update.

Figure 4:
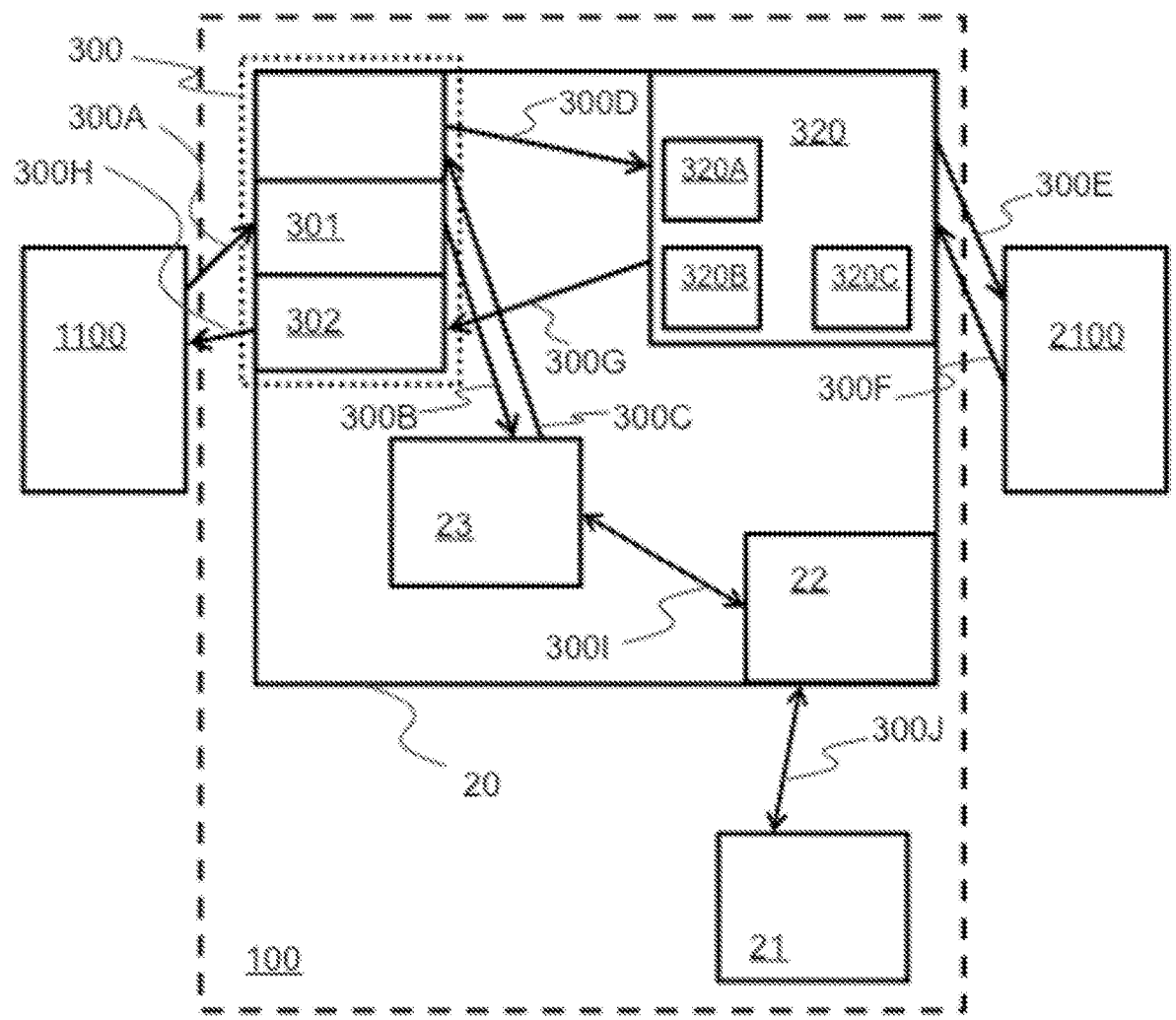
FIG. 4 is a further illustration of a RBD device according to the second embodiment of the present invention.

Referring now to FIG. 4, which shows a further illustration of the RBD device according to the second embodiment of the present invention 20, wherein the RBD 20 further comprises a programmable metadata store 23, in place of (as shown), or optionally additional to, a metadata store 310, and an Admin interface 22, arranged co-operatively with the programmable metadata store 23 (as illustrated by arrow 300I) and an Admin control 21 (as illustrated by arrow 300J). RBD device 20 is capable of operating independently of the Admin control 21, in a manner similar to RBD device 10, whereupon the Admin Interface 22 becomes (temporarily) redundant. The RBD device 20 is not required to be continually comprised in a system 100 with the Admin Control 21 but may be preferentially arranged thus, if so desired.

The API (application programming interface) 300 and Enterprise data collector 330, as described with reference to FIG. 3B and FIG. 3D, respectively, are also comprised in the device of FIG. 4, as shown.

Figure 5:
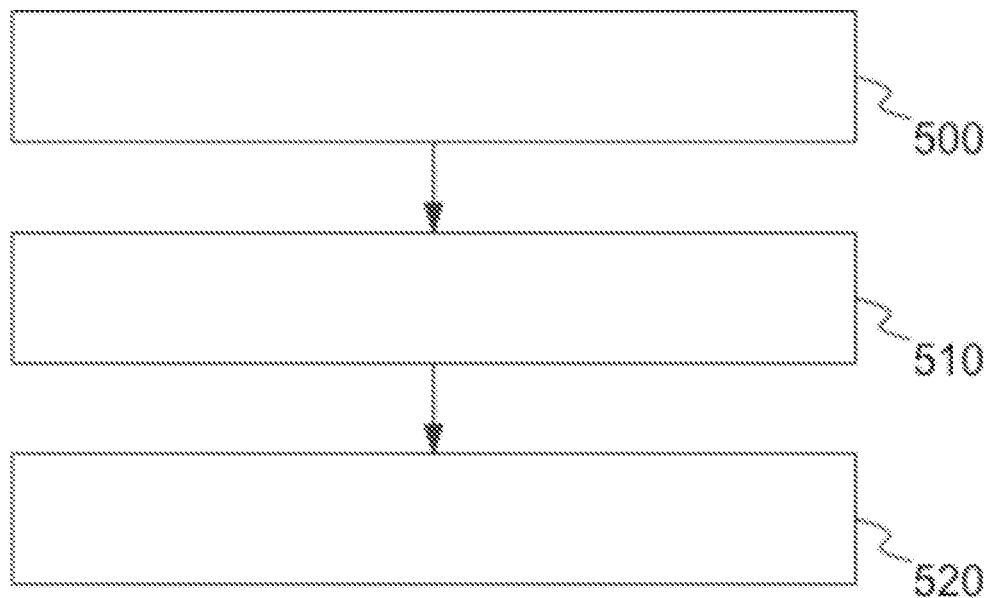
FIG. 5 is an illustration of steps of a method of employing the device of FIG. 3A.

Referring now to FIG. 5, FIG. 5 is an illustration of steps of a method of employing the device of FIG. 3A. The method comprises the steps of:—
arranging 500 an API input 301 capable of receiving a request 300A from an application (APP) 30, located on a user device 1100 associated with a user 1000, for the purposes of requesting metadata, said metadata being specific to at least one contact option 2100 arranged in association with at least one Enterprise 2000, said API input being comprised in an API Interface 300 of the RBD 10 20;
storing 510 metadata specific to the at least one Enterprise 2000 in a metadata store 310 comprised in the RBD 10 20;
arranging 520 a Communications Manager 320 in co-operation with the API interface 300 and the at least one contact option 2100, for facilitating contact between the user device 1100 and the at least one contact option 2100.

Figure 6:
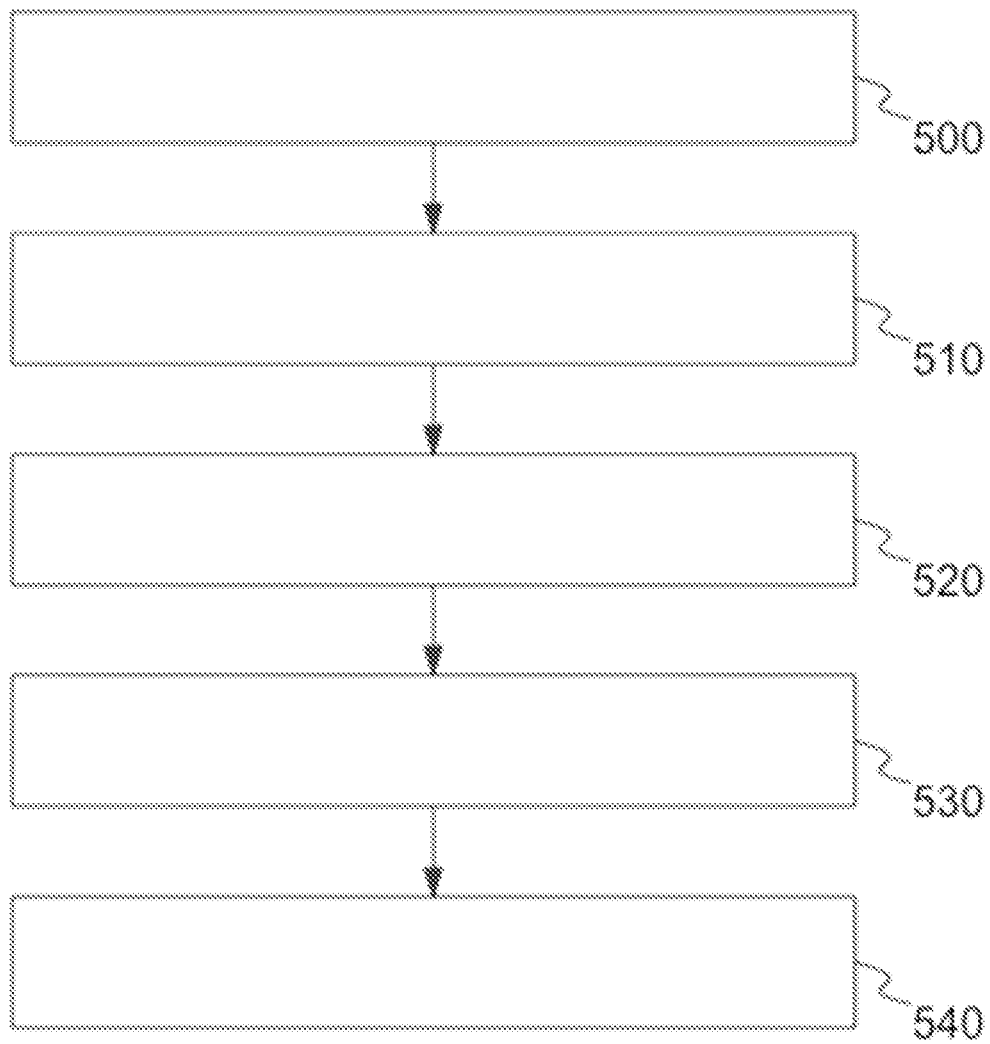
FIG. 6 is an illustration of steps of a preferred method of employing the device of FIG. 4, here introducing the concept of updates using the system comprising the admin control.

Referring now to FIG. 6, FIG. 6 is an illustration of steps of a preferred method of employing the device of FIG. 4, here introducing the concept of updates using the system comprising the admin control. The method comprises the steps of the method of FIGS. 5 (500 to 520) plus the additional steps of:— arranging 530 the metadata store 310 to comprise a programmable metadata store, PMS 23.

providing 540 a redirection bridge system 100 comprising a redirection bridge device, RBD 20, further comprising an Admin control 21 arranged in co-operation with an Admin interface 22, said Admin interface 22 being arranged located on the redirection bridge device 20 and further arranged in co-operation with the PMS 23, such that the Admin control 21 is arranged capable of amending or updating the metadata comprised in the PMS 23 by means of the Admin interface 22.

Figure 7:
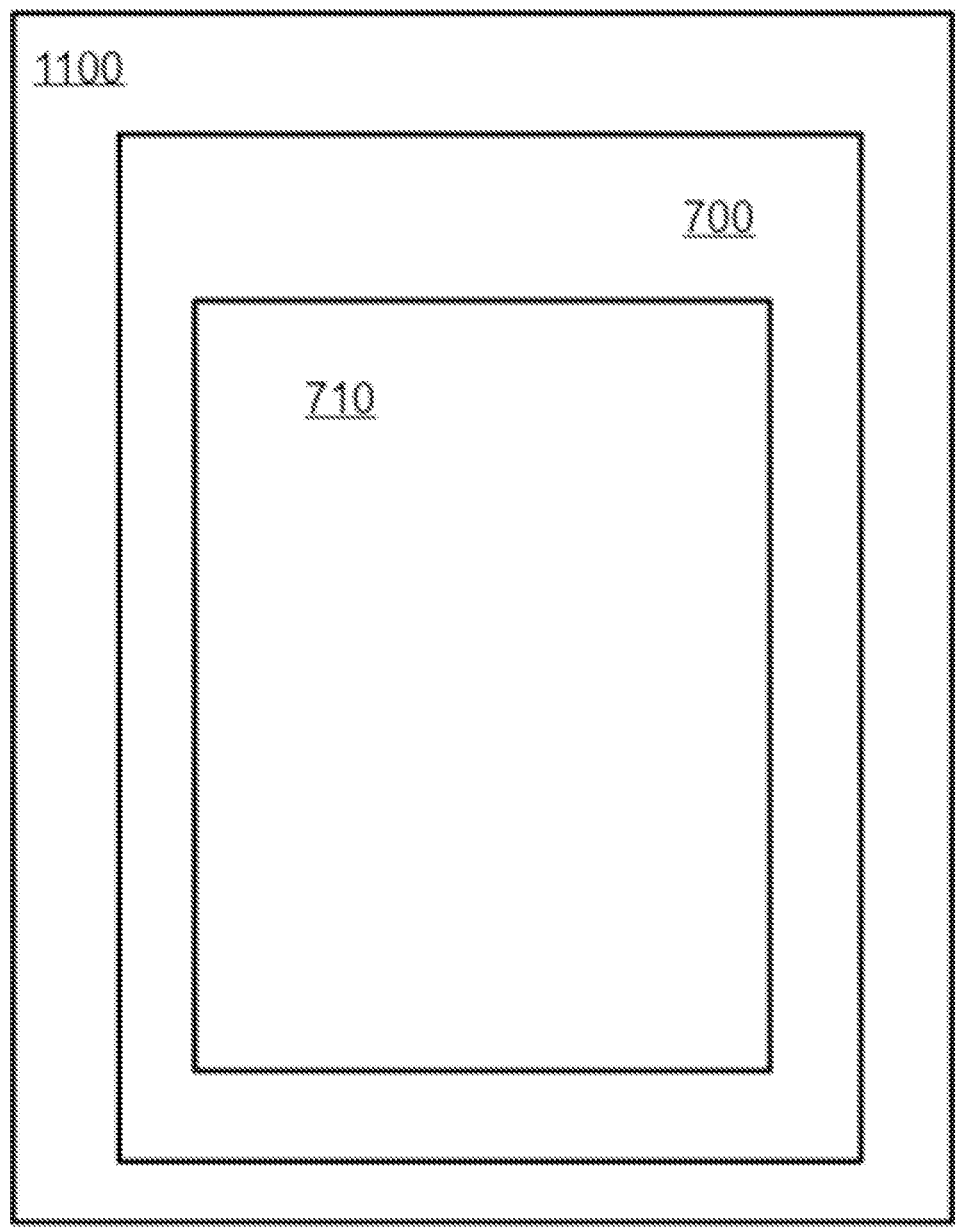
FIG. 7 is a schematic illustration of a Facebook user interface comprised in association with an APP and arranged capable of facilitating use of an RBD device according to an embodiment of the present invention.

Referring now to FIG. 7, FIG. 7 is a schematic illustration of a Facebook user interface comprised in association with an APP and arranged capable of facilitating use of an RBD device 10 20 according to an embodiment of the present invention. The figure shows the user interface (UI) 700 of a user device 1100, here a mobile device such as a smart phone. The user interface is arranged to display a website associated with the Enterprise 2000 (not shown) on a screen 710. The website information originates via the RBD 10 20 according to an embodiment of the present invention rather than the user 1000 (not shown) being obliged to connect to the Enterprise website 2100 directly. The figure illustrates a preferred example of use of user interface 700 which should not be considered as limiting. The user interface is described here in terms of Facebook (or Facebook Messenger) but this should not be considered as limiting. Other suitable interfaces, e.g. comprising Twitter, Apple Business Chat, Wechat, etc., are also susceptible for inclusion and are compatible with the embodiments of the present invention.

Figure 8:
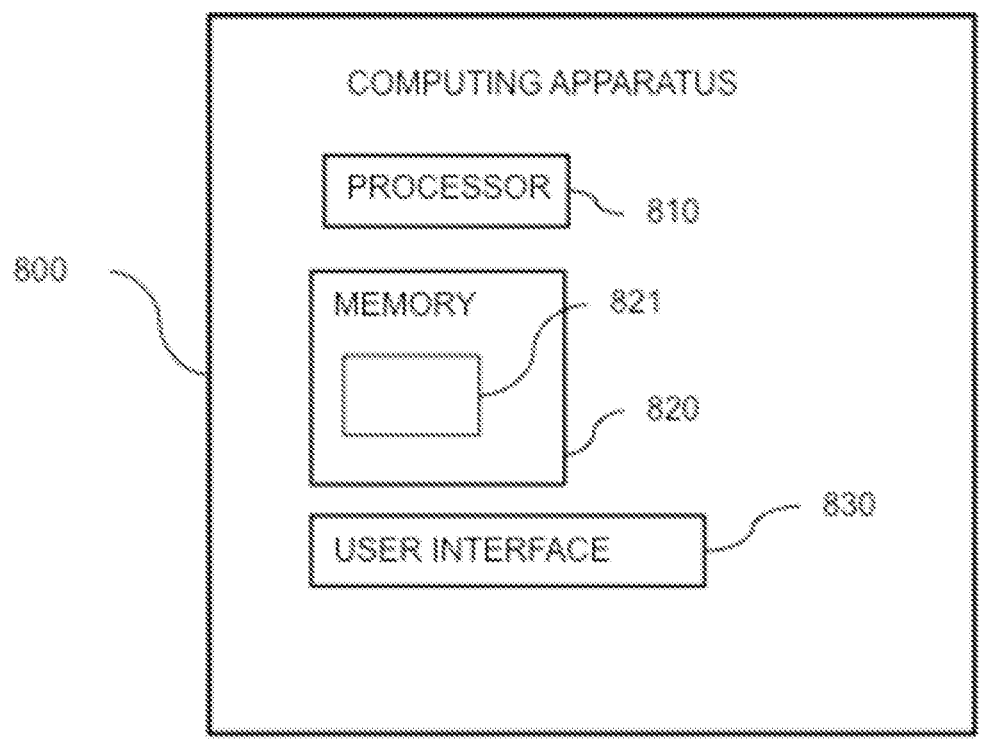
FIG. 8 is an illustration of a block diagram of a computing apparatus suitable for implementing and practicing aspects of the disclosed embodiments of the present invention.

Referring now to FIG. 8, FIG. 8 is an illustration of a block diagram of a computing apparatus 800 suitable for implementing and practicing aspects of the disclosed embodiments of the present invention. The computing apparatus 800 of FIG. 8 comprises a processor 810, a memory 820, optionally comprising computer readable program code 821, and further comprises a user interface 830.

FIG. 8 shows a block diagram of a computing apparatus 800 that may be used to practice aspects of the disclosed embodiments. For example, any of the devices, remote platforms and systems disclosed herein, alone or in any combination, may be implemented using the computing apparatus 800. The computing apparatus 800 may include computer readable program code 821 stored on at least one non-transitory computer readable medium 820 for carrying out and executing the process steps described herein. The computer readable medium 820 may be a memory of the computing apparatus 800. In alternate aspects, the computer readable program code may be stored in a memory external to, or remote from, the apparatus 800. The memory may include magnetic media, semiconductor media, optical media, or any media which is readable and executable by a computer. Computing apparatus 800 may also include a microprocessor 810 for executing the computer readable program code 821 stored on the at least one computer readable medium 820. In at least one aspect, computing apparatus may include one or more input or output devices, generally referred to as a user interface 830 which may operate to allow input to the computing apparatus 800 or to provide output from the computing apparatus 800.

Figure 9:
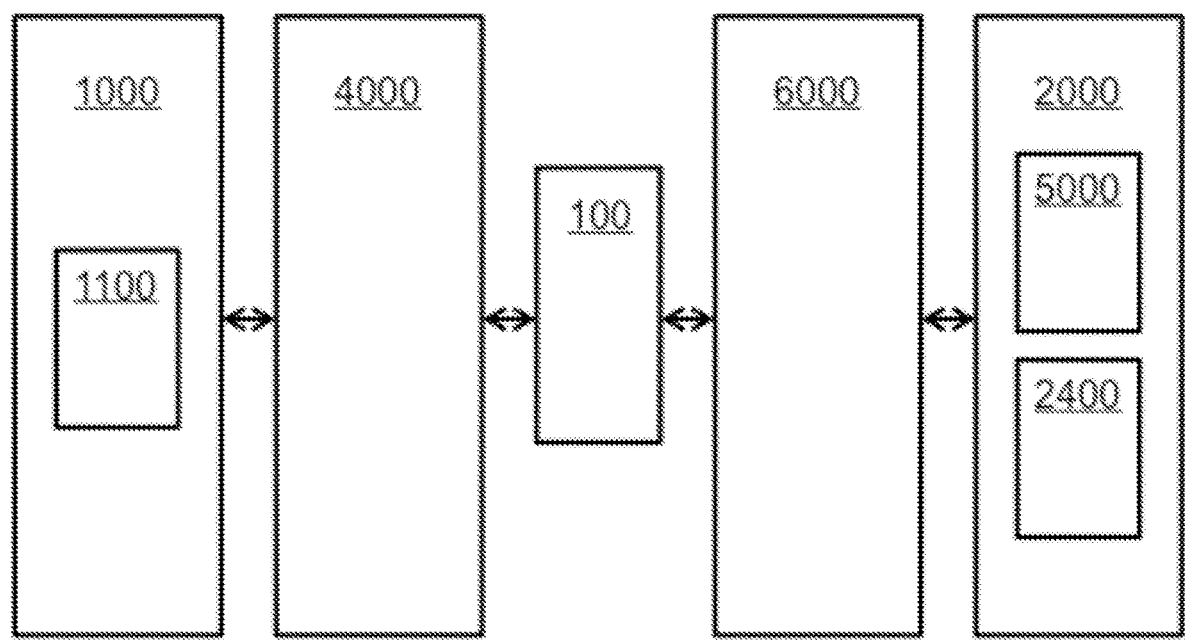
FIG. 9 is a schematic illustration of a contact centre ecosystem comprising a RBD device according to any embodiment of the present invention; and, FIG. 10 is a schematic illustration of a plurality of interactions effected between at least one user and at least one Enterprise, according to the state of the art.
Figure 10:
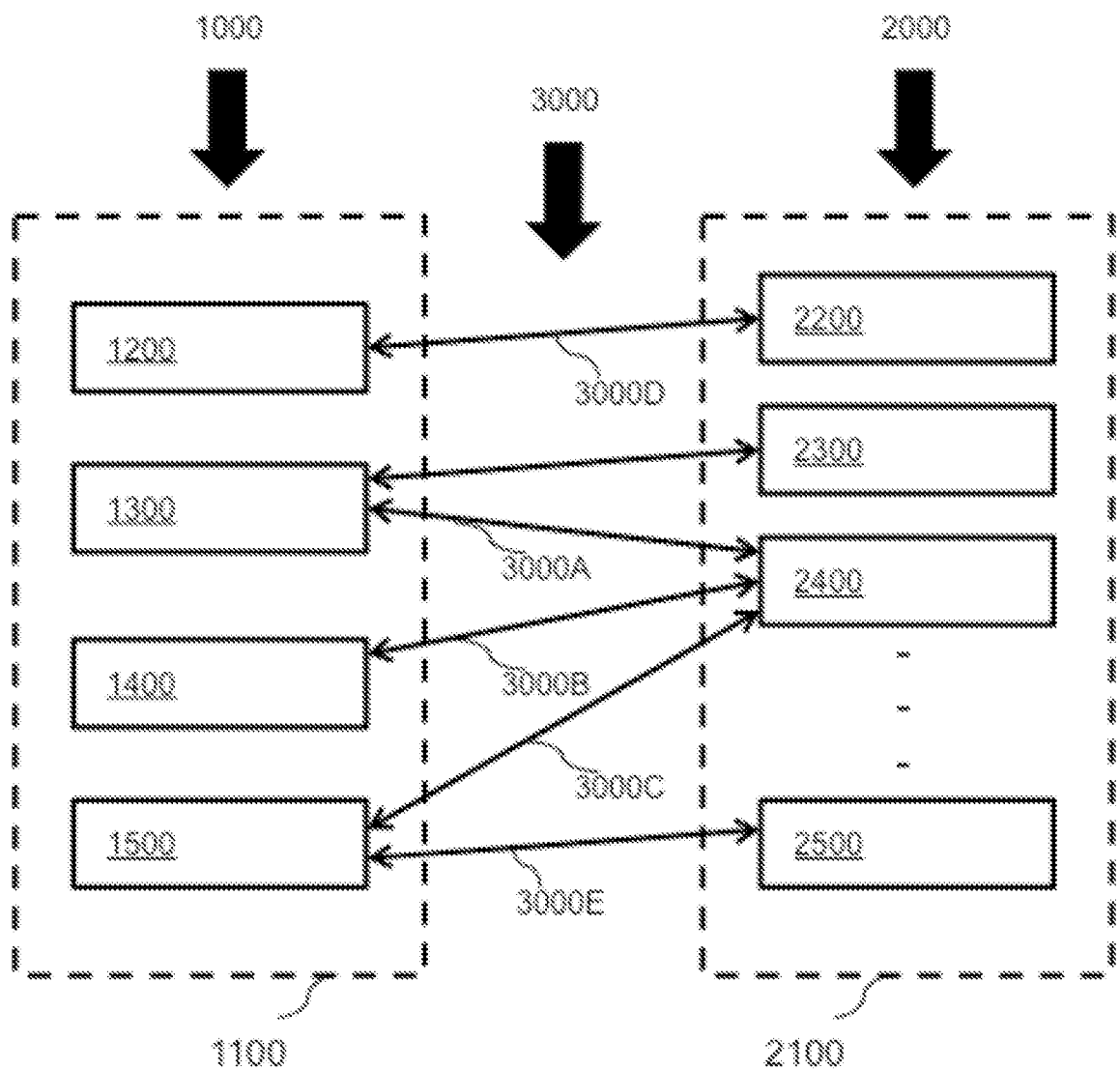

Referring now to FIG. 9, FIG. 9 is a schematic illustration of a contact centre ecosystem 900 comprising a RBD device 10 20 (not shown) or system 100 according to any embodiment of the present invention. Messaging user(s) 1000 such as users utilising at least one smart phone or other mobile device 1100 are provided messaging capability by means of messaging platforms 4000. Examples of messaging platforms include but are not limited to: SMS, MMS, Messenger, Google and/or Viber. The RBD device 10 20 (not shown) or system 100, according to any embodiment of the present invention, comprises functionality which permits interaction between the RBD device 10 20 (not shown) or system 100 and the various messaging platforms 4000 by means of established means, methods and protocols. At the Enterprise(s) 2000 side, chat and contact centre vendors 5000 provide at least one Enterprise contact centre 2400. Examples of chat and contact centre vendors 5000 include but are not limited to: Cisco, Avaya, eGain, Oracle and/or Salesforce. By means of integration partners 6000, which include but are not limited to Converge One, CDW, Dimension Data and/or Arrow, the Enterprise(s) contact centre(s) also interact with the RBD device 10 20 or system 100, according to embodiments of the present invention by known means, methods and protocols. The integration partners 6000 may further comprise intermediary services (not shown) which may include but are not limited to AI systems, virtual agents and/or automated 'bot' services. The RBD device 10 20 or system 100 comprising the RBD device 10 20 thus form a bridge between the user 1000 and Enterprise 2000, providing additional value and functionality to the user 1000 as described above.

Although embodiments of the invention are described in the foregoing, it will be appreciated that the present invention is also susceptible to being implemented such that more than one RBD device according to any embodiment of the present invention is capable of being utilised in the manner discussed above simultaneously with another RBD device. Only a single RBD device is shown in the figures for clarity. Further, it should also be noted that the APP 30, located on the user device, is exemplary only. The APP 30 could also be implemented as an application programming interface (API), dedicated to the user device, or as an Integration Point, said Integration Point being arranged to handle any kind of interaction the user device 1100 might have with a device 10 20 according to any embodiment of the present invention.

Modifications to embodiments of the invention described in the foregoing are possible without departing from the scope of the invention as defined by the accompanying claims. Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural. Numerals included within parentheses in the accompanying claims are intended to assist understanding of the claims and should not be construed in any way to limit subject matter claimed by these claims.

LIST OF REFERENCE NUMERALS

10 RBD device according to a first embodiment of the present invention
20 RBD device according to a second embodiment of the present invention
21 Admin control
22 Admin interface
23 programmable metadata store (PMS)

30 APP₁
31 APPₙ
100 system comprising an RBD device according to a second embodiment of the present invention
300 API interface
  301 API input
  302 API output
  303 RBD admin component
  304 translator module
300A to 300J arrows indicating data or information transfer between components of the RBD device (10 20) or system (100)
310 metadata store
320 Communications Manager
  320A Chat Manager
  320B Web portal Manager
  320C Message Transfer System
321 line indicating association
322 line indicating association
323 line indicating association
324 arrow indicating interaction (escalation/de-escalation) between Chat Manager 320A and Web portal Manager 320B
330 Enterprise data collector
  331 controller
  332 tailored interface
500 to 540 method steps
700 user interface UI
710 screen
800 computing apparatus
810 processor
820 memory
  821 computer readable program code
830 user interface
900 contact centre ecosystem
1000 user
1100 mobile device
1200 dedicated Enterprise APP
1300 email
1400 SMS
1500 voice call
2000 Enterprise
2100 Enterprise contact options
  2200 dedicated Enterprise APP
  2300 web portal
  2400 Contact Centre
  2400A Contact Centre
  2400B Contact Centre
  2500 phone
  2600 option to be added
3000 arrows indicating interactions between user and Enterprise
3000A arrow email to Contact Centre
3000B arrow SMS to Contact Centre
3000C arrow voice call to Contact Centre
3000D arrow dedicated APP to dedicated APP
3000E arrow voice call to phone line
4000 messaging platforms
5000 chat and contact centre vendors
6000 integration partners or integration platform

The invention claimed is:

1. A redirection bridge device (RBD) comprising:
at least one processor configured to:
via an input to an application programming interface (API) executed by the at least one processor, receive a request from an application (APP) stored on a user device of a user, said request comprising a request for metadata and/or a request for connection to at least one Enterprise, said metadata being specific to at least one contact option associated with the at least one Enterprise,
via an output of the API executed by the at least one processor:
output metadata from the API to the user device in response to the request for metadata, and
divert metadata in response to the request for connection to the at least one Enterprise, and
via a Communications Manager executed by the at least one processor:
receive said metadata diverted by the API,
contact the at least one contact option based on said metadata, and
forward information received from the at least one contact option to the API; and
at least one memory configured as a metadata store, to store metadata specific to the at least one Enterprise, and configured to provide the metadata to the at least one processor in response to the request,
wherein the at least one processor is further configured to:
at the output of the API, receive from the Communications Manager the information received from the at least one contact option, and
via the output of the API, forward the information received from the at least one contact option to the user device so as to connect the user device to the at least one Enterprise via the RBD.

2. The redirection bridge device (RBD) according to claim 1,
wherein at least a portion of the Communications Manager is dedicated to a specific communication task or format, and
wherein the at least one processor is further configured to, via the Communications Manager, assign the specific communication task or format to the at least one Enterprise according to a type of communication interaction with the at least one Enterprise.

3. The redirection bridge device (RBD) according to claim 1, wherein the at least one processor is further configured to execute a Chat Manager or a Web portal Manager or a Message Transfer System or an active component of a Message Transfer System as part of the Communications Manager.

4. The redirection bridge device (RBD) according to claim 1, wherein the stored metadata comprises:
at least one URL for connection to the at least one Enterprise, or
a list of a plurality of Enterprises and metadata associated with each of said plurality of Enterprises, or
the at least one contact option.

5. The redirection bridge device (RBD) according to claim 1, wherein the output of metadata from the API output comprises a transfer of metadata or data to the application (APP) on the user device.

6. The redirection bridge device (RBD) according to claim 5, wherein said data transferred to the application (APP) comprises Enterprise data.

7. The redirection bridge device (RBD) according to claim 1, wherein the at least one memory is further configured to store programmable metadata.

8. A redirection bridge system comprising:
the redirection bridge device according to claim 7; and
an Admin controller configured to provide amendments for the programmable metadata to an Admin interface executed by the at least one processor of the redirection bridge device, such that the Admin controller is configured to amend or update the programmable metadata stored in the memory of the redirection bridge device.

9. The redirection bridge system according to claim 8, wherein the at least one processor of the RBD is further configured to facilitate communication with a user via a messaging platform that facilitates access to the application (APP) stored on the user device associated with said user; and/or
wherein the at least one processor of the RBD is further configured to facilitate communication with the at least one contact option via an integration platform that facilitates access to the at least one contact option associated with the at least one Enterprise.

10. A communication system comprising the redirection bridge system according to claim 7.

11. A communication system comprising the redirection bridge device RBD according to claim 1.

12. The communication system according to claim 11, wherein the at least one processor is further configured to:
via a messaging platform executed by the at least one processor, provide messaging capability to the user device associated with said user; and/or
via an integration platform executed by the at least one processor, provide contact center services to the at least one contact option associated with the at least one Enterprise.

13. The redirection bridge device (RBD) according to claim 1, wherein the API further comprises a RBD admin component and a translator module.

14. A method of redirection bridging, comprising the steps of:
receiving a request from an application (APP) stored on a user device of a user via an input of an application programming interface (API), said request comprising a request for metadata and/or a request for connection to at least one Enterprise, said metadata being specific to at least one contact option associated with the at least one Enterprise, said API being executed by at least one processor of a redirection bridge device (RBD);
storing metadata specific to the at least one Enterprise in at least one memory of the RBD configured as a metadata store;
providing said metadata from the at least one memory to the API according to the request;
outputting metadata, via an output of the API, to the user device in response to the request for metadata;
diverting metadata, via the output of the API, in response to the request for connection to the at least one Enterprise;
receiving, via a Communications Manager executed by the at least one processor of the RBD, said metadata diverted by the API;
contacting, via the Communications Manager, the at least one contact option based on said metadata;
forwarding, via the Communications Manager, information received from the at least one contact option to the API;
receiving, at the output of the API from the Communications Manager, the information received from the at least one contact option; and
forwarding, via the output of the API, the information received from the at least one contact option to the user device so as to connect a user associated with the user device to the at least one Enterprise via the RBD.

15. The method of redirection bridging according to claim 14, wherein:
at least a portion of the Communications Manager is dedicated to a specific communication task or format and the method further comprises assigning the specific communication task or format to the at least one Enterprise according to a type of communication interaction with the at least one Enterprise; and/or
the at least one processor is further configured to execute a Chat Manager or a Web portal Manager or a Message Transfer System or an active component of a Message Transfer System as part of the Communications Manager; and/or
the stored metadata comprises at least one URL for connection to the at least one Enterprise, or a list of a plurality of Enterprises and metadata associated with each Enterprise, or the at least one contact option; and/or
outputting the metadata from the API output comprises transferring metadata or data to the application (APP) on the user device; and/or
the RBD comprises an admin component and a translator module; and/or
the method further comprises storing programmable metadata in the memory of the RBD.

16. The method according to claim 15, wherein said data transferred to the APP comprises Enterprise data.

17. The method according to claim 15, wherein said data transferred to the APP comprises metadata.

18. The method of redirection bridging according to claim 14, further comprising:
storing programmable metadata in the at least one memory of the RBD; and
amending or updating the programmable metadata stored in the memory via an Admin interface executed by the at least one processor of the RBD.

19. A non-transitory machine readable data storage media, comprising machine-readable instructions that, when executed by computing hardware, cause said hardware to carry out all the steps of the method according to claim 14.

* * * * *